United States Patent
McDaniel et al.

(10) Patent No.: US 10,550,319 B2
(45) Date of Patent: Feb. 4, 2020

(54) WELLBORE SERVICING COMPOSITIONS AND METHODS OF MAKING AND USING SAME

(71) Applicant: Halliburton Energy Services, Inc., Houston, TX (US)

(72) Inventors: Cato Russell McDaniel, The Woodlands, TX (US); Eric Davidson, Cults (GB)

(73) Assignee: Halliburton Energy Services, Inc., Houston, TX (US)

( * ) Notice: Subject to any disclaimer, the term of this patent is extended or adjusted under 35 U.S.C. 154(b) by 959 days.

(21) Appl. No.: 13/857,639

(22) Filed: Apr. 5, 2013

(65) Prior Publication Data
US 2014/0303047 A1 Oct. 9, 2014

(51) Int. Cl.
*C09K 8/90* (2006.01)
*C09K 8/86* (2006.01)

(52) U.S. Cl.
CPC . *C09K 8/90* (2013.01); *C09K 8/86* (2013.01)

(58) Field of Classification Search
None
See application file for complete search history.

(56) References Cited

U.S. PATENT DOCUMENTS

| | | | |
|---|---|---|---|
| 3,077,454 A | 2/1963 | Monroe et al. | |
| 4,390,451 A | 6/1983 | Havinga et al. | |
| 4,996,153 A | 2/1991 | Cadmus et al. | |
| 5,501,276 A | 3/1996 | Weaver et al. | |
| 5,678,632 A | 10/1997 | Moses et al. | |
| 5,697,443 A | 12/1997 | Brezinski et al. | |
| 5,881,813 A | 3/1999 | Brannon et al. | |
| 6,110,875 A | 8/2000 | Tjon-Joe-Pin et al. | |
| 6,148,917 A * | 11/2000 | Brookey | C09K 8/02 166/301 |
| 6,817,414 B2 | 11/2004 | Lee | |
| 7,216,704 B2 | 5/2007 | Hanes, Jr. et al. | |
| 7,262,154 B2 | 8/2007 | Griffin et al. | |
| 7,621,334 B2 | 11/2009 | Welton et al. | |
| 7,906,464 B2 | 3/2011 | Davidson | |
| 7,992,656 B2 | 8/2011 | Dusterhoft et al. | |
| 8,043,996 B2 | 10/2011 | Harris et al. | |
| 8,361,937 B2 | 1/2013 | Cassidy et al. | |
| 2004/0055747 A1 | 3/2004 | Lee | |
| 2005/0056423 A1* | 3/2005 | Todd | C09K 8/52 166/278 |
| 2009/0163389 A1* | 6/2009 | De Campo et al. | 507/218 |
| 2010/0252267 A1* | 10/2010 | Harris | C09K 8/52 166/307 |
| 2012/0145401 A1 | 6/2012 | Reyes | |
| 2012/0238479 A1 | 9/2012 | Choudhary et al. | |
| 2014/0151042 A1* | 6/2014 | Faugerstrom | C09K 8/506 166/278 |

FOREIGN PATENT DOCUMENTS

| | | |
|---|---|---|
| CA | 2723856 C | 11/2009 |
| WO | 2004094780 A1 | 11/2004 |
| WO | 2008073233 A2 | 6/2008 |
| WO | 2013022648 A2 | 2/2013 |

OTHER PUBLICATIONS

Foreign communication from a related counterpart application—International Search Report and Written Opinion, PCT/US2014/030269, dated Jun. 11, 2014, 11 pages.
Baroid Product Data Sheet entitled "BDF™-442 Filter Cake Breaker," Mar. 25, 2010, 1 page, Halliburton.
Baroid Product Data Sheet entitled "BDF™-443 Filter Cake Breaker," Mar. 25, 2010, 1 page, Halliburton.
Baroid Product Data Sheet entitled "CFS™-485 Casing Cleaner," Mar. 25, 2010, 1 page, Halliburton.
Halliburton brochure entitled "GasPerm 1000(SM) Service," Apr. 2008, 2 pages, Halliburton.
Halliburton brochure entitled "LoSurf-259™ Nonemulsifier," Oct. 2007, 2 pages, Halliburton.
Halliburton brochure entitled "LoSurf-300M™ Nonionic Surfactant," Jul. 2010, 1 page, Halliburton.
Halliburton brochure entitled "LoSurf-357™ Surfactant," Feb. 2008, 2 pages, Halliburton.
Halliburton brochure entitled "LoSurf-400™ Surfactant," Nov. 2007, 2 pages, Halliburton.
Halliburton brochure entitled "LoSurf-2000S™ Surfactant," Dec. 2007, 2 pages, Halliburton.
Halliburton brochure entitled "MSA II™ Corrosion Inhibitor," Jan. 2008, 2 pages, Halliburton.
Halliburton brochure entitled "MSA III™ Corrosion Inhibitor," Sep. 2009, 1 page, Halliburton.
Halliburton brochure entitled "Musol® Mutual Solvent," Feb. 2007, 2 pages, Halliburton.
Halliburton brochure entitled "NEA-96M™ Surfactant," Jan. 2008, 2 pages, Halliburton.
Halliburton brochure entitled "Oxol II™ Oxidant/Polymer Solvent," Jan. 2008, 2 pages, Halliburton.
Halliburton brochure entitled "Pen-88 HT™ High-Temperature Surfactant," Jan. 2008, 2 pages, Halliburton.
Halliburton brochure entitled "Pen-88M™ Surfactant," May 2009, 2 pages, Halliburton.
Halliburton brochure entitled "550-21MW™ Foaming Surfactant," Jan. 2008, 2 pages, Halliburton.

(Continued)

*Primary Examiner* — Jeffrey D Washville
(74) *Attorney, Agent, or Firm* — Haynes and Boone, LLP

(57) ABSTRACT

A method of servicing a wellbore in a subterranean formation comprising preparing a wellbore servicing fluid comprising (i) a breaking agent, a breaking agent precursor, or combinations thereof, wherein the breaking agent comprises a sugar acid and (ii) an aqueous base fluid, and contacting the wellbore servicing fluid with a filter cake in the wellbore and/or subterranean formation.

12 Claims, No Drawings

(56) References Cited

OTHER PUBLICATIONS

Bipp, H.-P., et al., "Heavy metal leaching of fly ash from waste incineration with gluconic acid and a molasses hydrolysate," Chemosphere, 1998, pp. 2523-2533, vol. 36, No. 11, Elsevier Science Ltd.

Sawyer, Donald T., "Metal-gluconate complexes," 1964, pp. 633-643.

Patent Examination Report No. 1 issued by the Australian Patent Office in corresponding Australian application No. 2014254399 dated Dec. 24, 2015, 3 pages.

Examination Report for Canadian Patent Application No. 2,903,603 prepared by the Canadian Intellectual Property Office dated Sep. 6, 2016. (4 pages).

Examination Report for Canadian Patent Application No. 2,903,603 prepared by the Canadian Intellectual Property Office dated Jun. 14, 2017. (3 pages).

\* cited by examiner

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of treating a wellbore to remove filter cakes.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

During the drilling operation, a drilling fluid, also referred to as drilling mud, is conventionally circulated through the wellbore as the borehole is drilled. The presence of such a drilling mud aids in the drilling operation, for example, by removing cuttings from the wellbore, (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. As the drilling mud is circulated through the wellbore during a drilling operation, the drilling mud is deposited on the surfaces of the growing wellbore in a thin, low-permeability layer known as a filter cake, thus inhibiting the loss of mud and/or mud filtrate or other wellbore fluids to the formation during the drilling and/or other servicing operations. Prior to production, the filter cake is removed to allow the unimpeded flow of natural resources to the wellbore.

An ongoing challenge is to both efficiently remove the filter cake while minimizing damage to the formation or the wellbore. When strong acids, such as hydrochloric acid, or low pH solutions are used for the removal of the filter cake, there is a corrosion risk to wellbore equipment, (e.g., safety valves, casings, production tubing, mandrels, pipes, separators, pumps, etc.). The use of strong acids for filter cake removal can also lead to the formation of "wormholes," which occurs when the strong acid attacks the filter cake in localized spots and creates holes in the filter cake, as opposed to removing the entire filter cake. One way to circumvent this problem would be by using high pH solutions (e.g., pH greater than 7) for the removal of filter cakes. However, the filter cake breaking agents that chelate the metal ions from the filter cake at low pH values are usually ineffective in high pH environments. Thus, an ongoing need exists for more effective compositions and methods of removing filter cakes in subterranean formations.

SUMMARY

Disclosed herein is a method of servicing a wellbore in a subterranean formation comprising preparing a wellbore servicing fluid comprising (i) a breaking agent, a breaking agent precursor, or combinations thereof, wherein the breaking agent comprises a sugar acid and (ii) an aqueous base fluid, and contacting the wellbore servicing fluid with a filter cake in the wellbore and/or subterranean formation.

Also disclosed herein is a method of servicing a wellbore in a subterranean formation comprising preparing a wellbore servicing fluid comprising (i) a breaking agent, a breaking agent precursor, or combinations thereof and (ii) an aqueous base fluid; wherein the breaking agent comprises a sugar acid, and the breaking agent precursor comprises an ester of at least one hydroxyl and/or one carboxylic acid functionalities of a sugar acid, and contacting the wellbore servicing fluid with a filter cake in the wellbore and/or subterranean formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a breaking agent and/or a breaking agent precursor, and a sufficient amount of an aqueous base fluid to form a pumpable WSF. Utilization of a WSF comprising a breaking agent and/or a breaking agent precursor in the methods disclosed herein may advantageously facilitate the removal of at least a portion of a filter cake in a wellbore and/or subterranean formation.

In an embodiment, the WSF comprises a breaking agent. As used herein, the term "breaking agent" or "breaker" refers to a compound that functions to remove at least a portion of a filter cake from a wellbore and/or subterranean formation. In an embodiment, the breaking agent is a chelant. Without wishing to be limited by theory, a chelant or chelating agent is a chemical compound that forms soluble, complex molecules, i.e., "chelates," with certain metal ions, inactivating the ions so that they cannot normally react with other elements or ions to make undesirable products, such as for example precipitates. The process by which chelates form as a result of the interaction between chelants and metal ions, for example, is termed chelation. Further, without wishing to be limited by theory, chelation represents the formation or presence of two or more bonds (or other attractive interactions), which are generally termed coordinate bonds, between two or more separate binding sites, which are generally termed coordination sites or chelation sites, within the same ligand and a single central atom. A ligand with two or more coordination sites can be generally described as bidentate or didentate (for two coordination sites), tridentate (for three coordination sites), tetradentate (for four coordination sites), pentadentate (for five coordination sites), . . . , polydentate or multidentate (for multiple coordination sites).

In an embodiment, the breaking agent may be a naturally-occurring material. Alternatively, the breaking agent comprises a synthetic material. Alternatively, the breaking agent comprises a mixture of a naturally-occurring and a synthetic material.

In an embodiment, a breaking agent suitable for use in the present disclosure comprises a sugar acid and/or a sugar acid salt (e.g., a Na salt, a K salt, an ammonium (i.e., $NH_4^+$) salt, etc.). Without wishing to be limited by theory, sugar acids are monosaccharides, disaccharides, and/or derivatives thereof, which contain at least one carboxylic acid group. Such sugar acids may be found in nature and/or they may be obtained by any suitable methodology, such as for example oxidizing a monosaccharide, a disaccharide, and/or derivatives thereof.

Nonlimiting examples of sugar acids suitable for use in the present disclosure include aldonic acids, gluconic acid, mannoic acid, mannonic acid, gulonic acid, galactonic acid, arabonic acid, allonic acid, altronic acid, idonic acid, talonic acid, glyceric acid, xylonic acid, lyxonic acid glucoheptonic acid (i.e., D-glycero-D-guloheptonic acid), fructonic acid, ascorbic acid; ulosonic acids, neuraminic acid, sialic acid, N-acetylneuraminic acid, N-acetyltalosaminuronic acid, N-glycolylneuraminic acid, ketodeoxyoctulosonic acid (i.e., 3-deoxy-D-manno-oct-2-ulosonic acid); uronic acids, glucuronic acid, galacturonic acid, iduronic acid, mannuronic acid; aldaric acids, tartaric acid, meso-galactaric acid (i.e., mucic acid), D-glucaric acid or saccharic acid, isosaccharinic acid; threonic acid; lactobionic acid; muramic acid; pangamic acid; salts thereof, or combinations thereof. In an embodiment, the breaking agent comprises sodium gluconate.

In an embodiment, the breaking agent comprises a molasses hydrolysate. Without wishing to be limited by theory, the molasses hydrolysate may be obtained by oxidizing molasses, and since molasses has a high content of carbohydrates, such as monosaccharides and disaccharides, the molasses hydrolysate has a high content of sugar acids, such as for example gluconic acid, glucaric acid, tartaric acid, threonic acid, and the like; the molasses hydrolysate may also comprise a variety of other acids, such as for example oxalic acid, glyceric acid, glycolic acid, lactic acid, formic acid, acetic acid, and the like.

In an embodiment, a breaking agent suitable for use in the present disclosure comprises a sugar acid which may function as a multidentate chelant for metal ions. Such breaking agent (e.g., chelant) may be characterized by a complexation constant or stability constant, which is often expressed as a logarithm of an equilibrium constant. In an embodiment, the breaking agent may have the logarithm of the equilibrium constant in the range of from about 1 to about 30, alternatively from about 2 to about 25, or alternatively from about 5 to about 20. Without wishing to be limited by theory, the complexation constant or stability constant of a chelant is the logarithm of the equilibrium constant, which indicates the stability of the complexes formed by the chelant. The larger the value of the complexation constant, the more stable the complex formed by the chelant with a particular ion, the better the chelant for chelating such particular ion. Generally, the reported complexation constant is normally determined for the fully deprotonated form of the molecule (e.g., a chelant molecule), which relates/corresponds to the ability of the molecule (e.g., chelant molecule) to chelate a cation (e.g., metal ion). The complexation constant is dependent upon a variety of parameters, with the temperature and the pH influences being significant factors in the value of the complexation constant. Furthermore, the reported complexation constant is typically measured at room temperature.

In an embodiment, a breaking agent suitable for use in the present disclosure may be used in an environment that has a pH value of greater than about 7, alternatively from about 7 to about 13, alternatively from about 8 to about 13, alternatively from about 7 to about 12, or alternatively from about 8 to about 12.

In an embodiment, the breaking agent may be included within the WSF in a suitable or effective amount (e.g., an amount effective to remove a desired amount of filter cake from a wellbore and/or subterranean formation). The resultant concentration and/or amount of breaking agent that is necessary may be dependent upon a variety of factors such as the composition of the WSF, the presence or absence of various additives; the composition of the filter cake; the thickness of the filter cake; the temperature of the operational environment (e.g., the wellbore); the composition of the formation, the pressure of the formation, the diameter of the hole, the particular breaking agent used, the expected contact time of the breaking agent with the filter cake; the desired amount of time necessary for removal of the filter cake; or combinations thereof. In an embodiment, a breaking agent of the type disclosed herein may be present within the WSF in an amount of from about 0.01 wt. % to about 50 wt. %, alternatively from about 0.1 wt. % to about 25 wt. %, alternatively from about 0.1 wt. % to about 20 wt. %, or alternatively from about 10 wt. % to about 25 wt. %, based on the total weight of the WSF.

In an embodiment, the WSF comprises a breaking agent precursor. Herein a breaking agent precursor is defined as a material or combination of materials that provides for delayed release of one or more breaking agents (e.g., sugar acids) of the type previously described herein. Such breaking agent precursors may also be referred to as time-delayed and/or time-released breaking agents. Breaking agent precursors suitable for use in this disclosure may comprise a material or combination of materials that react to generate and/or liberate a breaking agent (e.g., sugar acid) after a period of time has elapsed. The liberation of the breaking agent (e.g., sugar acid) from the breaking agent precursor may be accomplished through any means known to one of ordinary skill in the art with the benefits of this disclosure and compatible with the user-desired applications. In embodiments, breaking agent precursors may be formed by modifying breaking agents (e.g., sugar acids) via the addition of an operable functionality or substituent, physical encapsulation or packaging, or combinations thereof. The operable functionality and/or substituent may be acted upon in any fashion (e.g., chemically, physically, thermally, etc.) and under any conditions compatible with the process in order to release the breaking agent (e.g., sugar acid) at a desired time and/or under desired conditions such as in situ wellbore conditions. In an embodiment, the breaking agent precursor comprises at least one modified sugar acid functionality (e.g., hydroxyl (e.g., —OH), carboxylic acid (e.g., —COOH) and/or carboxylate (e.g., —COO$^-$) species) such that when acted upon and/or in response to pre-defined conditions (e.g., in situ wellbore conditions such as temperature, pressure, chemical environment, pH changes, etc.), a breaking agent (e.g., a sugar acid) is released. In an embodiment, the breaking agent precursor may comprise a breaking agent (e.g., a sugar acid) that is released after exposure to an elevated temperature such as a wellbore temperature (e.g., from about 80° F. to about 300° F.). In an embodiment, the breaking agent precursor comprises a material which reacts with one or more components of the WSF (e.g., reacts with an aqueous fluid present in the WSF) to liberate at least one breaking agent (e.g., sugar acid). In an embodiment, the breaking agent precursor comprises a material which reacts with one or more compounds present within the wellbore and/or surrounding formation (e.g., reacts with an aqueous fluid present in situ within the wellbore and/or surrounding formation, for example a naturally occurring aqueous formation fluid) to liberate at least one breaking agent (e.g., sugar acid).

In an embodiment, the hydroxyl (e.g., —OH), carboxylic acid (e.g., —COOH) and/or carboxylate (e.g., —COO$^-$) functionalities of the breaking agent (e.g., sugar acid) may be protected with any suitable protective group, such as for example an ester, an amide, an anhydride, or combinations thereof, to delay the release of the hydroxyl (e.g., —OH), carboxylic acid (e.g., COOH) and/or carboxylate (e.g., —COO$^-$) functionalities. Without wishing to be limited by theory, a protective group is meant to temporarily inhibit the function (e.g., chelation) of the functional group (e.g., hydroxyl (e.g., —OH), carboxylic acid (e.g., —COOH) and/or carboxylate (e.g., —COO$^-$) functionalities) it is protecting; the function (e.g., chelation) of the functional group (e.g., hydroxyl (e.g., —OH), carboxylic acid (e.g., —COOH) and/or carboxylate (e.g., —COO$^-$) functionalities) may be restored by removing the protective group by using any suitable methodology.

In an embodiment, the breaking agent precursor comprises an ester. Hereinafter, for simplicity, the remainder of the disclosure will focus on the use of an ester as the breaking agent precursor with the understanding that other breaking agent precursors may be used in various embodiments. It will be appreciated by one of ordinary skill in the art and with the help of this disclosure that the ester of the sugar acid may be an ester of one or more hydroxyl (e.g., —OH) functionalities of the sugar acid. Alternatively, as it will be appreciated by one of ordinary skill in the art and with the help of this disclosure, the ester of the sugar acid may be an ester of one or more carboxylic acid (e.g., —COOH) and/or carboxylate (e.g., —COO$^-$) functionalities of the sugar acid. Further, as it will be appreciated by one of ordinary skill in the art and with the help of this disclosure, the ester of the sugar acid may comprise both an ester of one or more hydroxyl (e.g., —OH) functionalities of the sugar acid, and an ester of one or more carboxylic acid (e.g., —COOH) and/or carboxylate (e.g., —COO$^-$) functionalities of the sugar acid. In an embodiment, one or more hydroxyl (e.g., —OH), carboxylic acid (e.g., —COOH) and/or carboxylate (e.g., —COO$^-$) functionalities of the breaking agent comprising a sugar acid may be protected with an ester group to delay the release of the hydroxyl (e.g., —OH), carboxylic acid (e.g., —COOH) and/or carboxylate (e.g., —COO$^-$) functionalities.

Nonlimiting examples of esters for protecting one or more hydroxyl (e.g., —OH) functionalities of the sugar acid suitable for use in the present disclosure include esters of lactic acid with a sugar acid (e.g., lactates, dilactates, trilactates), an ester of lactic acid with gluconic acid, gluconic acid monolactate, gluconic acid dilactate, gluconic acid trilactate; esters of formic acid with a sugar acid (e.g., formates, diformates, triformates), an ester of formic acid with gluconic acid, gluconic acid monoformate, gluconic acid diformate, gluconic acid triformate; esters of acetic acid with a sugar acid (e.g., acetates, diacetates, triacetates), an ester of acetic acid with gluconic acid, gluconic acid monoacetate, gluconic acid diacetate, gluconic acid triacetate; esters of propionic acid with a sugar acid (e.g., propionates, dipropionates, tripropionates), an ester of propionic acid with gluconic acid, gluconic acid monopropionate, gluconic acid dipropionate, gluconic acid tripropionate; esters of butyric acid with a sugar acid (e.g., butyrates, dibutyrates, tributyrates), an ester of butyric acid with gluconic acid, gluconic acid monobutyrate, gluconic acid dibutyrate, gluconic acid tributyrate; esters of monochloroacetic acid with a sugar acid (e.g., monochloroacetates), an ester of monochloroacetic acid with gluconic acid, gluconic acid mono (monochloroacetate), gluconic acid di(monochloroacetate), gluconic acid tri(monochloroacetate); esters of dichloroacetic acid with a sugar acid (e.g., dichloroacetates), an ester of dichloroacetic acid with gluconic acid, gluconic acid mono(dichloroacetate), gluconic acid di(dichloroacetate), gluconic acid tri(dichloroacetate); esters of trichloroacetic acid with a sugar acid (e.g., trichloroacetates), an ester of trichloroacetic acid with gluconic acid, gluconic acid mono (trichloroacetate), gluconic acid di(trichloroacetate), gluconic acid tri(trichloroacetate); derivatives thereof; or combinations thereof. Other acids suitable for forming esters with one or more hydroxyl (e.g., —OH) functionalities of the sugar acid include without limitations nitric acid, sulphuric acid, sulphonic acid, sulphinic acid, phosphoric acid, phosphorous acid, phosphonic acid, phosphinic acid, sulphamic acid, and the like.

Nonlimiting examples of esters for protecting one or more carboxylic acid (e.g., —COOH) and/or carboxylate (e.g., —COO$^-$) functionalities of the sugar acid suitable for use in the present disclosure include aliphatic esters, alkyl esters, methyl esters, ethyl esters, propyl esters, n-propyl esters, iso-propyl esters, butyl esters, n-butyl esters, iso-butyl esters, t-butyl esters, aromatic esters, benzyl esters, silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, and the like, or combinations thereof.

The ester may be converted to a hydroxyl (e.g., —OH), carboxylic acid (e.g., —COOH) and/or carboxylate (e.g., —COO$^-$) functionalities by hydrolysis of the ester linkage, for example by contact with water present in the aqueous fluid of the WSF and/or water present in situ in the wellbore. It will be appreciated by one of ordinary skill in the art and with the help of this disclosure that the presence of different ester protective groups in a breaking agent will allow for releasing of different hydroxyl (e.g., —OH), carboxylic acid (e.g., —COOH) and/or carboxylate (e.g., —COO$^-$) functionalities at different times.

The choice and physical form of a suitable breaking agent precursor may depend on a variety of factors including but not limited to the time at which liberation of the acidic species is desired relative to the placement of the WSF in the wellbore; the environmental conditions presented; the conditions within the wellbore; the temperature of the wellbore section in which the WSF is being placed; the composition of the formation water, etc. Other considerations may be evident to those skilled in the art with the benefits of this disclosure.

In an embodiment, the breaking agent precursor may be characterized as exhibiting a suitable delay time. As used herein, the term "delay time" refers to the period of time from when a breaking agent precursor, or a combination of breaking agent precursors, is introduced into an operational environment until the breaking agent precursor or combination of precursors has degraded a sufficient degree to alter (i.e., begin to degrade) the filter cake, as will be disclosed herein. As will be appreciated by one of skill in the art viewing this disclosure, differing breaking agent precursors may exhibit varying delay times. As such, in an embodiment, a breaking agent precursor, or combination of breaking agent precursors, may be selected for inclusion in a wellbore servicing fluid such that the breaking agent precursor(s) exhibit a desired average delay time. In an embodiment, the breaking agent precursor may exhibit an average delay time of at least about 1 hour, alternatively at least about 2 hours, alternatively at least about 4 hours, alternatively at least about 8 hours, alternatively at least about 12 hours, or alternatively at least about 24 hours.

In an embodiment, the breaking agent precursor may be characterized as operable within a suitable temperature range. As will be appreciated by one of skill in the art viewing this disclosure, differing breaking agent precursors may exhibit varying temperature ranges of operability. As such, in an embodiment, a breaking agent precursor, or combination of breaking agent precursors, may be selected for inclusion in the wellbore servicing fluid such that the breaking agent precursor(s) exhibit a user and/or process-desired operable temperature range (e.g., an ambient downhole temperature for a given wellbore). In addition, as will also be appreciated by one of skill in the art viewing this disclosure, the degradation (e.g., hydrolysis) of the breaking agent precursor may be influenced by the temperature of the operational environment. For example, the rate of degradation of a given breaking agent precursor may generally be higher at higher temperatures. As such, the rate of degradation (e.g., hydrolysis) of a given breaking agent precursor may be generally higher when exposed to the environment within the wellbore as compared to the temperature at the surface of the wellbore. In an embodiment, the breaking agent precursor may exhibit an operable temperature range of from about 65° F. to about 400° F., alternatively from about 100° F. to about 300° F., or alternatively from about 150° F. to about 250° F.

In an embodiment, the breaking agent precursor may be included within the WSF in a suitable amount. The concentration of the breaking agent precursor within the WSF may be selected to achieve a given concentration of breaking agent upon degradation (e.g., hydrolysis) of the breaking agent precursor. In an embodiment, the breaking agent precursor may be included within the WSF in amount suitable or effective to provide a corresponding suitable or effective amount of breaking agent upon degradation (e.g., an amount effective to reduce/eliminate a desired amount of filter cake from a surface of a wellbore and/or a subterranean formation). The resultant concentration and/or amount of breaking agent precursor that is necessary may be dependent upon a variety of factors such as the composition of the aqueous base fluid, the presence or absence of various additives; the composition of the filter cake; the thickness of the filter cake; the temperature of the operational environment (e.g., the wellbore); the composition of the formation, the pressure of the formation, the diameter of the hole, the particular breaking agent precursor used, the expected contact time of the generated breaking agent with the formation; the desired amount of time necessary for removal of the filter cake; or combinations thereof.

In an embodiment, a breaking agent precursor suitable for use in the present disclosure may be used in an environment that has a pH value of less than about 10, alternatively less than about 7, alternatively from about 5 to about 10, or alternatively from about 7 to about 10.

In an embodiment the breaking agent precursor is present within the WSF in an amount of from about 0.01 wt. % to about 50 wt. %, alternatively from about 0.1 wt. % to about 30 wt. %, alternatively from about 0.1 wt. % to about 20 wt. %, or alternatively from about 10 wt. % to about 30 wt. %, based on the total weight of the WSF.

In an embodiment, the WSF comprises a breaking agent precursor having a hydrolysable moiety (e.g., ester) as the operable functionality. In such an embodiment, the WSF may optionally comprise a rate adjustment material (RAM), which functions to adjust the hydrolysis rate of the breaking agent precursor.

The particular combinations of a RAM and a breaking agent precursor suitable for use in a WSF may be formulated by one of ordinary skill in the art with the benefits of this disclosure to produce a desired effect or profile (e.g., breaking agent release profile) at or over a period of time. Such release profiles may include a steady increase or decrease in release rate (i.e., constant slope), exponential increase or decrease in release rate, step-wise increases or decreases in release rates, maximums and/or minimums in release rate (e.g., bell-shaped profiles), and combinations thereof. In an embodiment, the RAM and breaking agent precursor may be included within the WSF in amount suitable or effective to provide a corresponding suitable or effective amount of breaking agent upon degradation (e.g., an amount effective to remove a desired amount of filter cake from a surface).

In an embodiment, the RAM comprises one or more pH-lowering materials (e.g., acids or acidic materials). For example, the RAM may comprise small amounts of one or more reactive materials (e.g., acids, mineral acids, organic acids, acidic anhydrides, p-toluenesulfonic acid) that decrease the pH and accelerate the hydrolysis of the breaking agent precursors. In other embodiments, the RAM comprises one or more pH increasing materials (e.g., bases or basic materials). For example, in some instances, such as with some esters, the hydrolysis rate may be slowed by the addition of a small amount of a strong base such as NaOH, $Na_2CO_3$ and $NaHCO_3$ or organic bases such as ethanolamine or other aliphatic or aromatic amine type compounds. In an embodiment, the RAM may comprise an esterase enzyme. Without wishing to be limited by theory, esterase enzymes are a subclass of hydrolase enzymes and may facilitate the hydrolysis of esters (e.g., esters present in a breaking agent precursor).

In an embodiment, the RAM may be included within the WSF in a suitable amount. In an embodiment, a RAM of the type disclosed herein may be present within the WSF in an amount of from about 1 wt. % to about 10 wt. %, alternatively from about 1.5 wt. % to about 5 wt. %, or alternatively from about 1.5 wt. % to about 3 wt. %, based on the total weight of the WSF.

Aqueous base fluids that may be used in the WSF include any aqueous fluid suitable for use in subterranean applications, provided that the aqueous base fluid is compatible with the breaking agent, breaking agent precursor, and/or RAM used in the WSF. For example, the WSF may comprise water or a brine. In an embodiment, the base fluid comprises an aqueous brine. In such an embodiment, the aqueous brine generally comprises water and an inorganic monovalent salt. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an embodiment, the salt or salts in the water may be present within the base fluid in an amount sufficient to yield a saturated brine. In an embodiment, the aqueous base fluid (e.g., brine) may be miscible with the breaking agent and/or the breaking agent precursor. As will be appreciated by one of skill in the art and with the help of this disclosure, the aqueous base fluid used for a particular wellbore servicing operation needs to have the density required by that particular wellbore servicing operation.

Nonlimiting examples of aqueous brines suitable for use in the present disclosure include chloride-based, bromide-based, or formate-based brines containing monovalent cations, salts of alkali metals, or combinations thereof. In an embodiment, the brine comprises monovalent cations. Additional examples of suitable brines include, but are not limited to: NaCl, KCl, NaBr, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 50 wt. % to about 95 wt. %, alternatively from about 70 wt. % to about 90 wt. %, or alternatively from about 75 wt. % to about 85 wt. %, based on the total weight of the WSF. Alternatively, the aqueous fluid may comprise the balance of the WSF after considering the amount of the other components used.

The WSF may further comprise additional additives as deemed appropriate for improving the properties of the fluid. Such additives may vary depending on the intended use of the fluid in the wellbore. Examples of such additives include, but are not limited to acids, bases, surfactants, mutual solvents, corrosion inhibitors, conventional breaking agents, emulsifiers, relative permeability modifiers, lime, organic/inorganic viscosifiers, gelling agents, crosslinkers, weighting agents, glass fibers, carbon fibers, suspending agents, clays, clay control agents, fluid loss control additives, dispersants, flocculants, conditioning agents, dispersants, water softeners, acids, foaming agents, proppants, salts, oxidation inhibitors, scale inhibitors, thinners, scavengers, gas scavengers, lubricants, friction reducers, antifoam agents, bridging agents, and the like, or combinations thereof. These additives may be introduced singularly or in combination using any suitable methodology and in amounts effective to produce the desired improvements in fluid properties. As will appreciated by one of skill in the art with the help of this disclosure, any of the components and/or additives used in the WSF have to be compatible with the breaking agent and/or breaking agent precursor used in the WSF composition. In an embodiment, acids and/or bases may be used for adjusting the pH of the WSF. Furthermore, acids and/or bases may function as a RAM in the WSF, for example in the presence of a breaking agent precursor having a hydrolysable moiety (e.g., ester).

In an embodiment, the WSF comprises an acid. In an embodiment, an acid may be used for decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of acids suitable for use in the present disclosure include acetic acid; formic acid; lactic acid; glycolic acid; oxalic acid; propionic acid; butyric acid; monochloroacetic acid; dichloroacetic acid; trichloroacetic acid; hydrochloric acid; hydrofluoric acid; nitric acid; sulphuric acid; sulphonic acid; sulphinic acid; phosphoric acid; phosphorous acid; phosphonic acid; phosphinic acid; sulphamic acid; methanesulfonic acid; or combinations thereof.

In an embodiment, the acid may be included within the WSF in any suitable amount necessary to adjust the pH of the WSF to a particular pH value (e.g., a target pH), such as for example a pH value of about 0, about 1, about 2, about 3, about 4, about 5, etc.

In an embodiment, the WSF comprises a base. In an embodiment, a base may be used for increasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of bases suitable for use in the present disclosure include ammonium and alkali metal carbonates and bicarbonates, $Na_2CO_3$, $K_2CO_3$, $NaHCO_3$, $KHCO_3$, alkali metal oxides, $Na_2O$, $Li_2O$, $K_2O$, alkali metal hydroxides, NaOH, $NH_4OH$, KOH, LiOH, alkali metal phosphates, $Na_3PO_4$, and the like, or combinations thereof.

In an embodiment, the base may be included within the WSF in any suitable amount necessary to adjust the pH of the WSF to a particular pH value (e.g., a target pH), such as for example a pH value of about 8, about 9, about 10, about 11, about 12, etc.

In an embodiment, the WSF comprises a surfactant. The surfactant may function to improve the compatibility of the WSF with other fluids (e.g., formation fluids) that may be present in the subterranean formation and/or to enhance contact of the WSF with one or more filter cake surfaces. In an embodiment, a surfactant may be used to enhance the reactivity of the WSF by, for example, breaking any emulsions present from the drilling fluid system or improving the interfacial interactions between the filter cake and the WSF thereby allowing the WSF to contact the filter cake more easily. Nonlimiting examples of surfactants suitable for use in the WSF include ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, betaines, modified betaines, alkylamidobetaines, cocamidopropyl betaine, quaternary ammonium compounds, trimethyltallowammonium chloride, trimethylcocoammonium chloride, or combinations thereof.

Other examples of surfactants that may be suitable for use in the present disclosure include without limitation CFS-485 casing cleaner, LOSURF-300M surfactant, LOSURF-357 surfactant, LOSURF-400 surfactant, LOSURF-2000S surfactant, LOSURF-2000M surfactant, LOSURF-259 nonemulsifier, NEA-96M surfactant, BDF-442 surfactant, and BDF-443 surfactant. CFS-485 casing cleaner is a blend of surfactants and alcohols; LOSURF-300M surfactant is a nonionic surfactant; LOSURF-357 surfactant is a nonionic liquid surfactant; LOSURF-400 surfactant is a nonemulsifier; LOSURF-2000S surfactant is a blend of an anionic nonemulsifier and an anionic hydrotrope; LOSURF-2000M surfactant is a solid surfactant; LOSURF-259 nonemulsifier is a nonionic, nonemulsfier blend; NEA-96M surfactant is a general surfactant and nonemulsifier; BDF-442 surfactant and BDF-443 surfactant are surfactants; all of which are commercially available from Halliburton Energy Services.

In an embodiment, the surfactants may be present in the WSF in an amount sufficient to prevent incompatibility with formation fluids or wellbore fluids. In an embodiment, where liquid surfactants are used, the surfactants may be present in an amount of from about 0.1 wt. % to about 5 wt. %, alternatively from about 0.5 wt. % to about 4 wt. %, or alternatively from about 1 wt. % to about 3 wt. %, based on the total weight of the WSF. In an embodiment, where powdered surfactants are used, the surfactants may be present in an amount in the range of from about 0.01 wt. % to about 1 wt. %, alternatively from about 0.05 wt. % to about 0.5 wt. %, or alternatively from about 0.1 wt. % to about 0.3 wt. %, based on the total weight of the WSF.

In some embodiments, it may be beneficial to add a surfactant to the WSF as it is being pumped downhole, inter allia, to help reduce the possibility of forming emulsions with the formation crude oil or injection fluids. In some embodiments, microemulsion additives optionally may be included in the WSF. Nonlimiting examples of microemulsion additives suitable for use in the present disclosure include PEN-88M surfactant, PEN-88HT surfactant, SSO-21E surfactant, SSO-21MW agent, and GASPERM 1000 service. PEN-88M surfactant is a nonionic penetrating surfactant; PEN-88HT surfactant is a high-temperature surfactant; SSO-21E surfactant is a foaming surfactant; SSO-21MW agent is a foaming surfactant and GASPERM 1000 service is a microemulsion; all of which are commercially available from Halliburton Energy Services, Inc.

In an embodiment, the WSF comprises a mutual solvent. Herein a mutual solvent is defined as a material that is soluble in oil, water, and acid-based treatment fluids. Given that the mutual solvent is miscible with more than one class of liquids, such materials can cause two ordinarily immiscible liquids to combine with each other. Nonlimiting examples of mutual solvents suitable for use in the present disclosure include glycol ethers, ethylene glycol monobutylether, diethylene glycol monobutylether, propylene glycol monobutylether; methanol; isopropyl alcohol; alcohol ethers; aldehydes; ketones; aromatic solvents; derivatives thereof; and combinations thereof. Nonlimiting examples of commercially available mutual solvents suitable for use in the present disclosure include MUSOL mutual solvent sold by Halliburton Energy Services, SOL-15 sold by Fracmaster Ltd., and SUPER-SOL sold by Osca.

In an embodiment, the mutual solvent may be included within the WSF in a suitable amount. In an embodiment a mutual solvent of the type disclosed herein may be present within the WSF in an amount of from about 1 wt. % to about 12 wt. %, alternatively from about 3 wt. % to about 10 wt. %, or alternatively from about 4 wt. % to about 8 wt. %, based on the total weight of the WSF.

In an embodiment, the WSF comprises a corrosion inhibitor. Without wishing to be limited by theory, a corrosion inhibitor is generally a chemical compound that may function to decrease (e.g., reduce, slow down, or lessen) the corrosion rate of a material, such as a metal or an alloy, typically by forming a coating, often a passivation layer, which prevents access of the corrosive substance to the metal or alloy.

In an embodiment, the corrosion inhibitor comprises a quaternary ammonium compound; unsaturated carbonyl compounds, 1-phenyl-1-ene-3-butanone, cinnamaldehyde; unsaturated ether compounds, 1-phenyl-3-methoxy-1-propene; unsaturated alcohols, acetylenic alcohols, methyl butynol, methyl pentynol, hexynol, ethyl octynol, propargyl alcohol, benzylbutynol, ethynylcyclohexanol; Mannich condensation products (such as those formed by reacting an aldehyde, a carbonyl containing compound and a nitrogen containing compound); condensation products formed by reacting an aldehyde in the presence of an amide; polysaccharides, inulin, tannins, tannic acid, catechin, epicatechin, epigallocatechin, epicatechingallate; formamide, formic acid, formates; other sources of carbonyl; iodides; fluorinated surfactants; quaternary derivatives of heterocyclic nitrogen bases; quaternary derivatives of halomethylated aromatic compounds; terpenes; aromatic hydrocarbons; coffee, tobacco, gelatin; derivatives thereof, and the like, or combinations thereof.

In an embodiment, the corrosion inhibitor comprises a quaternary ammonium compound of the general formula $(R)_4N^+X^-$, wherein the R groups represent the same or different long chain alkyl, cycloalkyl, aryl or heterocyclic groups and X represents an anion, such as for example a halide. Nonlimiting examples of quaternary ammonium compounds suitable for use in the present disclosure include N-alkyl, N-cycloalkyl and N-alkylaryl pyridinium halides, such as N-cyclohexylpyridinium bromide, N-octylpyridinium bromide, N-nonylpyridinium bromide, N-decylpyridinium bromide, N-dodecylpyridinium bromide, N,N-didodecyldipyridinium dibromide, N-tetradecylpyridinium bromide, N-laurylpyridinium chloride, N-do decylbenzylpyridinium chloride, N-dodecylquinolinium bromide, N-(1-methylnapthyl)quinolinium chloride, N-benzyl)quinolinium chloride, monochloromethylated and bischloromethylated pyridinium halides, ethoxylated and propoxylated quaternary ammonium compounds, sulfated ethoxylates of alkyl phenols and primary and secondary fatty alcohols, didodecyldimethylammonium chloride, hexadecylethyldimethylammonium chloride, 2-hydroxy-3-(2-undecylamidoethylamino)-propane-1-triethylammonium hydroxide, 2-hydroxy-3-(2-heptadecylamidoethylamino)-propane-1-triethylammonium hydroxide, 2-hydroxy-3-(2-heptadecylamidoethylamino)-propane-1-triethylammonium hydroxide, and the like, or combinations thereof.

Nonlimiting examples of commercially available corrosion inhibitors suitable for use in the present disclosure include MSA-II corrosion inhibitor, MSA-III corrosion inhibitor, HAI-25E+ environmentally friendly low temp corrosion inhibitor, HAI-404 acid corrosion inhibitor, HAI-50 inhibitor, HAI-60 corrosion inhibitor, HAI-62 acid corrosion inhibitor, HAI-65 corrosion inhibitor, HAI-72E+ corrosion inhibitor, HAI-75 high temperature acid inhibitor, HAI-81M acid corrosion inhibitor, HAI-85 acid corrosion inhibitor, HAI-85M acid corrosion inhibitor, HAI-202 environmental corrosion inhibitor, HAI-OS corrosion inhibitor, HAI-GE corrosion inhibitor, FDP-S692-03 corrosion inhibitor for organic acids, FDP-S656AM-02 environmental corrosion inhibitor system and FDP-S656BW-02 environmental corrosion inhibitor system, all of which are available from Halliburton Energy Services, Inc.

In an embodiment, a corrosion inhibitor intensifier may be used with a corrosion inhibitor. A corrosion inhibitor intensifier may function to enhance the activity of the corrosion inhibitor, e.g., decrease further the corrosion rate. Nonlimiting examples of commercially available corrosion inhibitor intensifiers suitable for use in the present disclosure include HII-500 corrosion inhibitor intensifier, HII-500M corrosion inhibitor intensifier, HII-124 acid inhibitor intensifier, HII-124B acid inhibitor intensifier, HII-124C inhibitor intensifier, and HII-124F corrosion inhibitor intensifier, all of which are available from Halliburton Energy Services, Inc.

In an embodiment, the corrosion inhibitor may be included within the WSF in a suitable amount. As will be appreciated by one of skill in the art, and with the help of this disclosure, the amount of corrosion inhibitor necessary for a particular application is highly dependent on a variety of parameters, such as for example temperature and type of metallurgy (e.g., the composition of the equipment that is intended to be protected by such corrosion inhibitor). In an embodiment a corrosion inhibitor of the type disclosed herein may be present within the WSF in an amount of from about 0.01 wt. % to about 5 wt. %, alternatively from about 0.1 wt. % to about 4 wt. %, or alternatively from about 1 wt. % to about 3 wt. %, based on the total weight of the WSF.

In an embodiment, the WSF comprises a conventional breaking agent. As used herein, the term "conventional breaking agent" refers to a material that cooperates with the breaking agent and/or the breaking agent precursor in the removal of the filter cake. In an embodiment, the conventional breaking agent comprises an enzyme, an oxidant, a chelating agent, or combinations thereof.

In an embodiment, the conventional breaking agent comprises xanthanase, which is an enzyme configured for the degradation of xanthan polymers. Xanthanase may also be employed within the WSF as a catalyst of ester hydrolysis. An example of a xanthanase suitable for use in the present disclosure is commercially available from Halliburton Energy Services, Inc. as a part of the N-FLOW line of service formulations.

In an embodiment, the conventional breaking agent is an oxidant. Nonlimiting examples of oxidants suitable for use in the present disclosure include an oxide, a peroxide, GBW-40 breaker, SP breaker, OXOL II breaker, or combinations thereof. GBW-40 breaker is a strong oxidizer breaker, SP breaker is a water-soluble oxidizing breaker and OXOL II breaker is a delayed release oxidizing breaker, all of which are commercially available from Halliburton Energy Services, Inc.

In an embodiment, the conventional breaking agent is a chelating agent. Nonlimiting examples of chelating agents suitable for use in the present disclosure include ethylenediaminetetraacetic acid, dimercaptosuccinic acid, dimercapto-propane sulfonate, α-lipoic acid, calcium disodium versenate, D-penicillamine, deferoxamine, defarasirox, dimercaprol, glutamic acid, diacetic acid, or combinations thereof.

In an embodiment, the conventional breaking agent may be included within the WSF in a suitable amount. In an embodiment a conventional breaking agent of the type disclosed herein may be present within the WSF in an amount of from about 0.1 wt. % to about 50 wt. %, alternatively from about 5 wt. % to about 50 wt. %, alternatively from about 10 wt. % to about 20 wt. %, or alternatively from about 0.2 wt. % to about 1 wt. %, based on the total weight of the WSF.

In an embodiment, the WSF comprises a breaking agent, a base, a surfactant, a mutual solvent, a corrosion inhibitor, and a brine. For example, the WSF may comprise 10 wt. % sodium gluconate, 1 wt. % CFS-485 casing cleaner, 3 wt. % MUSOL mutual solvent, 2 wt. % inulin, and 84 wt. % of a KCl brine with a concentration of 10% by weight, based on the total weight of the WSF. The base comprises NaOH in an amount suitable for adjusting the pH of the WSF to a value of about 10.

In an alternative embodiment, the WSF comprises a breaking agent, a base, a surfactant, a mutual solvent, and a brine. For example, the WSF may comprise 25 wt. % molasses hydrolysate, 1 wt. % LOSURF-300M surfactant, 3 wt. % MUSOL mutual solvent, and 71 wt. % of a KCl brine with a concentration of 10% by weight, based on the total weight of the WSF. The base comprises NaOH in an amount suitable for adjusting the pH of the WSF to a value of about 10.

In another embodiment, the WSF comprises a breaking agent precursor, an acid, a surfactant, a mutual solvent, a corrosion inhibitor, and a brine. For example, the WSF may comprise 10 wt. % gluconate precursor (e.g., an ester of formic acid with gluconic acid, such as gluconic acid monoformate), 1 wt. % cocamidopropyl betaine, 3 wt. % isopropyl alcohol, 1 wt. % MSA-II corrosion inhibitor, and 85 wt. % of a KCl brine with a concentration of 10% by weight, based on the total weight of the WSF. The acid comprises HCl in an amount suitable for adjusting the pH of the WSF to a value of about 5.

In an embodiment, the WSF composition comprising a breaking agent and/or a breaking agent precursor may be prepared using any suitable method or process. The components of the WSF (e.g., breaking agent and/or breaking agent precursor, aqueous base fluid, surfactant, etc.) may be combined and mixed in by using any mixing device compatible with the composition, e.g., a mixer, a blender, etc.

A breaking agent and/or breaking agent precursor of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to, drilling fluids or muds, spacer fluids, lost circulation fluids, cement slurries, washing fluids, sweeping fluids, acidizing fluids, fracturing fluids, gravel packing fluids, diverting fluids or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the components of the WSF are combined at the well site; alternatively, the components of the WSF are combined off-site and are transported to and used at the well site. In an embodiment, additional breaking agents (e.g., conventional breaking agents) may be added to the WSF on-the-fly (e.g., in real time or on-location) along with the other components/additives. The resulting WSF may be pumped downhole where it may function as intended (e.g., remove at least a portion of a filter cake in a wellbore and/or subterranean formation).

As it will be appreciated by one of ordinary skill in the art and with the help of this disclosure, a WSF may be used for the removal of filter cakes in any suitable stage of a wellbore's life, such as for example, during a drilling operation, completion operation, production stage, etc. In an embodiment, the breaking agents and/or breaking agent precursors of the WSF may be used for the removal of a filter cake comprising metal ions. Nonlimiting examples of metal ions that may be found in the filter cake include $Ca^{2+}$, $Mg^{2+}$, $Ba^{2+}$, $Sr^{2+}$, $Fe^{2+}$, $Fe^{3+}$, $Cu^{2+}$, $Ag^+$, $Ni^{2+}$, $Cr^{3+}$, and the like.

In an embodiment, the WSF may be utilized in a drilling and completion operation. In such an embodiment, a WSF as disclosed herein is utilized as a drilling mud by being circulated through the wellbore while the wellbore is drilled in a conventional manner. As will be appreciated by one of skill in the art viewing this disclosure, as the WSF is circulated through the wellbore, a portion of the WSF is deposited on the walls (e.g., the interior bore surface) of the wellbore, thereby forming a filter cake. The solids contained in the WSF (e.g., drilling mud) may contribute to the formation of the filter cake about the periphery of the wellbore during the drilling of the well. Debris such as drilling mud and filter cakes left in the wellbore can have an adverse effect on several aspects of a well's completion and production stages, from inhibiting the performance of downhole tools to inducing formation damage and plugging production tubing. The presence of the filter cake may inhibit the loss of drilling mud (e.g., the WSF) or other fluids into the formation while also contributing to formation control and wellbore stability. Accordingly, concurrent with and/or subsequent to drilling operations where a filter cake is formed on a downhole surface, a WSF comprising a breaking agent and/or breaking agent precursor may be placed downhole and contacted with the filter cake to remove all or a portion thereof.

In an additional embodiment, the WSF comprising a breaking agent and/or breaking agent precursor may be utilized in conjunction with a formation evaluation operation, such as for example electronically logging the wellbore. For example, in an embodiment, the wellbore may be evaluated via electronic logging techniques following sufficient contact between the filter cake and the WSF to remove all or a portion of the filter cake, as disclosed herein. In such an embodiment, a method of evaluating a formation utilizing a WSF of the type disclosed herein may generally comprise circulating a drilling fluid during a drilling operation and, upon the cessation of drilling operations and/or upon reaching a desired depth, removing the filter cake from a downhole surface (e.g., a wellbore surface, formation surface, etc.) utilizing a WSF, as disclosed herein. Upon sufficient removal of the filter cake, logging tools may be run into the wellbore to a sufficient depth to characterize a desired portion of the subterranean formation penetrated by the wellbore.

In an embodiment, when desired (for example, upon the cessation of drilling operations and/or upon reaching a desired depth), the wellbore or a portion thereof may be prepared for completion. In completing the wellbore, it may be desirable to remove all or a substantial portion of the filter cake from the walls of the wellbore and/or the subterranean formation.

In an embodiment, the method of using a WSF comprising a breaking agent and/or a breaking agent precursor of the type disclosed herein may comprise completing the wellbore. In such an embodiment, the wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the WSF comprising a breaking agent and/or breaking agent precursor, and/or removal of the filter cake. When the filter cake has been sufficiently degraded and/or removed from the downhole surface (e.g., wellbore surface, formation surface, etc.), the WSF may be displaced from the wellbore by pumping a flushing fluid, a spacer fluid, and/or a suitable cementitious slurry downward through an interior flowbore of the casing string and into an annular space formed by the casing string and the wellbore walls. When the cementitious slurry has been positioned, the cementitious slurry may be allowed to set.

In an embodiment, removing the filter cake may comprise contacting a WSF comprising a breaking agent and/or a breaking agent precursor of the type disclosed herein with the filter cake, which may have been formed by the circulation of a drilling mud during a drilling operation. In such an embodiment, a WSF comprising a breaking agent and/or a breaking agent precursor of the type disclosed herein may be placed within the wellbore.

In an embodiment, when a sufficient quantity of the WSF comprising a breaking agent and/or a breaking agent precursor has been placed within the wellbore, the WSF may be allowed to remain in contact with the filter cake for a sufficient period of time such that the breaking agent and/or the breaking agent precursor will remove all or a substantial portion of the filter cake. In an embodiment, when a sufficient quantity of the WSF comprising a breaking agent and/or a breaking agent precursor has been placed within the wellbore, the WSF may be allowed to remain in contact with the filter cake for a sufficient period of time such that the breaking agent precursor within the WSF will generate a sufficient quantity of the breaking agent (e.g., a sugar acid) to remove the filter cake. For example, in such an embodiment, the WSF comprising a breaking agent and/or a breaking agent precursor may be allowed to remain in contact with the filter cake for a soak-period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours, alternatively at least about 100 hours. In an embodiment, during such a "soak period," the fluids within the wellbore may remain in a substantially static state, for example, as opposed to a dynamic state in which circulation may be present. In an embodiment, the wellbore may be shut-in while the WSF remains in contact with the filter cake.

In an embodiment, removing the filter cake may comprise contacting a WSF with the filter cake, wherein the WSF comprises a breaking agent precursor. The contacting of the components of the WSF may initiate hydrolysis of the breaking agent precursor by the aqueous fluid, for example via hydrolysis and dissociation of ester groups present in the precursors. The WSF may be designed so as to produce the breaking agent (e.g., a sugar acid) in situ (e.g., within the wellbore) following placement at some user and/or process-desired location.

Without wishing to be limited by theory, as the breaking agent precursor is converted (e.g., hydrolyzes) to a breaking agent (e.g., sugar acid) within the wellbore, an acid other than the sugar acid may also be generated (e.g., liberated acid). For example, in an embodiment, when the breaking agent precursor comprises a sugar acid esterified with another acid (e.g., formic acid, acetic acid, chloroacetic acid, etc.), the hydrolysis of the breaking agent precursor (e.g., an ester) will not only produce the sugar acid, but will also produce/liberate the acid (e.g., formic acid, acetic acid, chloroacetic acid, etc.) that was used to esterify the sugar acid for obtaining the breaking agent precursor (e.g., an ester). In such embodiment, the liberated acids (e.g., formic acid, acetic acid, lactic acid, chloroacetic acid, etc.) may also contact and degrade the filter cake, and may also chelate metal ions present in the filter cake, thereby aiding in the filter cake removal process. Additionally, such liberated acids (e.g., formic acid, acetic acid, lactic acid, chloroacetic acid, etc.) may also function as RAMs, and may accelerate the hydrolysis of breaking agent precursors.

A WSF comprising a breaking agent precursor may exhibit a delayed filter cake removal when compared to a WSF comprising a breaking agent. For example, a WSF comprising a breaking agent precursor may exhibit filter cake removal that is delayed from about 1 hour to about 100 hours, alternatively equal to or greater than about 2 to about 3 hours, alternatively equal to or greater than about 24 hours, alternatively from equal to or greater than about 2 to about 5 days when compared to a WSF comprising a breaking agent. As noted previously, the extent of the delay may be adjusted by one of ordinary skill in the art with the benefit of this disclosure to meet the needs of the process by adjusting the nature of the precursors used (e.g., compound type, amounts, delaying mechanism employed, etc.) or through the addition of RAMs as described earlier. The WSFs disclosed herein may result in the removal of filter cakes in a time delayed fashion so as to allow for the efficient removal of filter cake while minimizing damage to the formation or equipment or to allow for other servicing operations. For example, a time delay in removing the filter cake may provide sufficient time for the WSF to become fully and evenly distributed along a desired section of the wellbore. Such even treatment prevents isolated breakthrough zones in the filter cake (e.g., wormholing) that may undesirably divert subsequent servicing fluids placed downhole. Also, time delays in removing the filter cake may allow for subsequent servicing steps such as removing servicing tools from the wellbore. Following treatment with a WSF comprising a breaking agent and/or a breaking agent precursor, further servicing operations may be performed (e.g., completion and/or production operations) as desired or appropriate, as for example in a hydrocarbon-producing well.

In an embodiment, the WSF comprising a breaking agent and/or a breaking agent precursor and methods of using the same disclosed herein may be advantageously employed as a servicing fluid in the performance of one or more wellbore servicing operations. For example, when utilizing a WSF comprising a breaking agent, the pH of the servicing fluid may be anywhere from neutral (e.g., a pH of about 7) to basic (e.g., a pH of about 10), and as such extremely corrosive conditions are avoided. Conventional breaking agents for wellbore applications are generally designed for use under acidic conditions only, when a lot of corrosion may occur, depending on the composition of the servicing fluid. In an embodiment, the use of breaking agents/and or breaking agent precursors in a basic (e.g., with a pH greater than about 7) fluid may advantageously cause less formation damage, when compared to the use of an acidic (e.g., with a pH of less than about 7) fluid is used for removing a filter cake.

In an embodiment, the breaking agent and/or the breaking agent precursor of the WSF may advantageously form a stronger complex (e.g., chelate) with metal ions present in the filter cake, when compared to breaking agents that would be based on saccharides (sugars) (e.g., monosaccharides, disaccharides, trisaccharides) that do not have a carboxylic acid functionality. Further, the breaking agent and/or the breaking agent precursor of the WSF may advantageously form a complex (e.g., chelate) with metal ions present in the filter cake much faster (e.g., in less time), when compared to breaking agents that would be based on saccharides (sugars) (e.g., monosaccharides, disaccharides, trisaccharides) that do not have a carboxylic acid functionality.

In an embodiment, the usage of a WSF comprising a breaking agent and/or a breaking agent precursor may advantageously allow for improved filter cake removal. The metal ions from the filter cake form a complex (e.g., chelate) with the breaking agent, and once the filter cake is removed off the surface of interest, the metal ions may advantageously remain in a chelated soluble form, thus preventing the possibility that such metal ions may precipitate and form solid particles, which solid particles may damage the formation. This may prove especially advantageous when the chelated metal ions are not flowed back to the surface, but may remain in the wellbore environment.

In an embodiment, when a WSF comprising a breaking agent precursor is used, the breaking agent precursor may advantageously release/liberate upon hydrolysis multiple functionalities that may degrade the filter cake. For example, the hydrolysis of a breaking agent precursor (e.g., an ester) may advantageously produce both a sugar acid and a liberated acid (e.g., formic acid, acetic acid, chloroacetic acid, etc.), and, in such instance, both the sugar acid and the liberated acid (e.g., formic acid, acetic acid, lactic acid, chloroacetic acid, etc.) may degrade and remove the filter cake.

Additional Disclosure

A first embodiment, which is a method of servicing a wellbore in a subterranean formation comprising preparing a wellbore servicing fluid comprising (i) a breaking agent, a breaking agent precursor, or combinations thereof and (ii) an aqueous base fluid; and contacting the wellbore servicing fluid with a filter cake in the wellbore and/or subterranean formation.

A second embodiment, which is the method of the first embodiment wherein the breaking agent comprises a sugar acid.

A third embodiment, which is the method of the second embodiment wherein the sugar acid comprises aldonic acids, gluconic acid, mannoic acid, mannonic acid, gulonic acid, galactonic acid, arabonic acid, allonic acid, altronic acid, idonic acid, talonic acid, glyceric acid, xylonic acid, lyxonic acid glucoheptonic acid (i.e., D-glycero-D-guloheptonic acid), fructonic acid, ascorbic acid; ulosonic acids, neuraminic acid, sialic acid, N-acetylneuraminic acid, N-acetyltalosaminuronic acid, N-glycolylneuraminic acid, ketodeoxyoctulosonic acid (i.e., 3-deoxy-D-manno-oct-2-ulosonic acid); uronic acids, glucuronic acid, galacturonic acid, iduronic acid, mannuronic acid; aldaric acids, tartaric acid, meso-galactaric acid (i.e., mucic acid), D-glucaric acid or saccharic acid, isosaccharinic acid; threonic acid; lactobionic acid; muramic acid; pangamic acid; salts thereof, or combinations thereof.

A fourth embodiment, which is the method of one of the second through third embodiments wherein the sugar acid comprises sodium gluconate.

A fifth embodiment, which is the method of one of the first through fourth embodiments wherein the breaking agent comprises a molasses hydrolysate.

A sixth embodiment, which is the method of one of the first through fifth embodiments wherein the breaking agent precursor comprises an ester, an amide and/or an anhydride of at least one hydroxyl and/or one carboxylic acid functionalities of a sugar acid.

A seventh embodiment, which is the method of the sixth embodiment wherein the ester protecting at least one hydroxyl functionality of the sugar acid comprises esters of lactic acid with a sugar acid (e.g., lactates, dilactates, trilactates), an ester of lactic acid with gluconic acid, gluconic acid monolactate, gluconic acid dilactate, gluconic acid trilactate; esters of formic acid with a sugar acid (e.g., formates, diformates, triformates), an ester of formic acid with gluconic acid, gluconic acid monoformate, gluconic acid diformate, gluconic acid triformate; esters of acetic acid with a sugar acid (e.g., acetates, diacetates, triacetates), an ester of acetic acid with gluconic acid, gluconic acid monoacetate, gluconic acid diacetate, gluconic acid triacetate; esters of propionic acid with a sugar acid (e.g., propionates, dipropionates, tripropionates), an ester of propionic acid with gluconic acid, gluconic acid monopropionate, gluconic acid dipropionate, gluconic acid tripropionate; esters of butyric acid with a sugar acid (e.g., butyrates, dibutyrates, tributyrates), an ester of butyric acid with gluconic acid, gluconic acid monobutyrate, gluconic acid dibutyrate, gluconic acid tributyrate; esters of monochloroacetic acid with a sugar acid (e.g., monochloroacetates), an ester of monochloroacetic acid with gluconic acid, gluconic acid mono (monochloroacetate), gluconic acid di(monochloroacetate), gluconic acid tri(monochloroacetate); esters of dichloroacetic acid with a sugar acid (e.g., dichloroacetates), an ester of dichloroacetic acid with gluconic acid, gluconic acid mono(dichloroacetate), gluconic acid di(dichloroacetate), gluconic acid tri(dichloroacetate); esters of trichloroacetic acid with a sugar acid (e.g., trichloroacetates), an ester of trichloroacetic acid with gluconic acid, gluconic acid mono (trichloroacetate), gluconic acid di(trichloroacetate), gluconic acid tri(trichloroacetate); derivatives thereof; or combinations thereof.

An eighth embodiment, which is the method of one of the sixth through seventh embodiments wherein the ester protecting at least one carboxylic acid functionality of the sugar acid comprises aliphatic esters, alkyl esters, methyl esters, ethyl esters, propyl esters, n-propyl esters, iso-propyl esters, butyl esters, n-butyl esters, iso-butyl esters, t-butyl esters, aromatic esters, benzyl esters, silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, and the like, or combinations thereof.

A ninth embodiment, which is the method of one of the first through eighth embodiments wherein the breaking agent and/or the breaking agent precursor is present in the wellbore servicing fluid in an amount of from about 0.01 wt. % to about 50 wt. %, based on the total weight of the wellbore servicing fluid.

A tenth embodiment, which is the method of one of the first through ninth embodiments wherein the aqueous base fluid comprises a brine.

An eleventh embodiment, which is the method of the tenth embodiment wherein the brine is present in the wellbore servicing fluid in an amount of from about 50 wt. % to about 95 wt. %, based on the total weight of the wellbore servicing fluid.

A twelfth embodiment, which is the method of one of the first through eleventh embodiments wherein the wellbore servicing fluid comprises a breaking agent and the wellbore servicing fluid has a pH of greater than about 7.

A thirteenth embodiment, which is the method of one of the first through twelfth embodiments wherein the wellbore servicing fluid comprises a breaking agent precursor and the wellbore servicing fluid has a pH of less than about 10.

A fourteenth embodiment, which is the method of one of the first through thirteenth embodiments wherein the wellbore servicing fluid optionally comprises a rate adjustment material, an acid, a base, a surfactant, a mutual solvent, a corrosion inhibitor, or combinations thereof.

A fifteenth embodiment, which is a method of servicing a wellbore in a subterranean formation comprising preparing a wellbore servicing fluid comprising (i) a breaking agent, a breaking agent precursor, or combinations thereof and (ii) an aqueous base fluid; wherein the breaking agent comprises a sugar acid, and the breaking agent precursor comprises an ester of at least one hydroxyl and/or one carboxylic acid functionalities of a sugar acid, and contacting the wellbore servicing fluid with a filter cake in the wellbore and/or subterranean formation.

A sixteenth embodiment, which is the method of the fifteenth embodiment wherein the sugar acid comprises sodium gluconate.

A seventeenth embodiment, which is the method of one of the fifteenth through sixteenth embodiments wherein the ester of at least one hydroxyl and/or one carboxylic acid functionalities of a sugar acid comprises an ester of formic acid with gluconic acid.

An eighteenth embodiment, which is the method of one of the fifteenth through seventeenth embodiments wherein the wellbore servicing fluid comprises a breaking agent and the wellbore servicing fluid has a pH of greater than about 7.

A nineteenth embodiment, which is the method of one of the fifteenth through eighteenth embodiments wherein the wellbore servicing fluid comprises a breaking agent precursor and the wellbore servicing fluid has a pH of less than about 10.

A twentieth embodiment, which is the method of one of the fifteenth through nineteenth embodiments wherein the wellbore servicing fluid optionally comprises a rate adjustment material, an acid, a base, a surfactant, a mutual solvent, a corrosion inhibitor, or combinations thereof.

A twenty-first embodiment, which is the method of one of the fifteenth through twentieth embodiments wherein the breaking agent and/or the breaking agent precursor is present in the wellbore servicing fluid in an amount of from about 0.01 wt. % to about 50 wt. %, based on the total weight of the wellbore servicing fluid.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
    preparing a wellbore servicing fluid comprising a breaking agent precursor and an aqueous base fluid, wherein the breaking agent precursor is present in an amount from about 10 wt. % to about 30 wt. % based on a total weight of the wellbore servicing fluid;
    contacting the wellbore servicing fluid with a filter cake on a surface of interest in the wellbore and/or subterranean formation;
    producing a breaking agent from the breaking agent precursor; and
    removing at least a portion of the filter cake from the surface of interest by reacting a portion of the filter cake with the breaking agent;
    wherein the breaking agent precursor comprises an ester, an amide and/or an anhydride of at least one hydroxyl and/or one carboxylic acid functionalities of a sugar acid.

2. The method of claim 1, wherein the ester protecting at least one hydroxyl functionality of the sugar acid comprises esters of lactic acid with a sugar acid, an ester of lactic acid with gluconic acid, gluconic acid monolactate, gluconic acid dilactate, gluconic acid trilactate, esters of formic acid with a sugar acid, an ester of formic acid with gluconic acid, gluconic acid monoformate, gluconic acid diformate, gluconic acid triformate, esters of acetic acid with a sugar acid, an ester of acetic acid with gluconic acid, gluconic acid monoacetate, gluconic acid diacetate, gluconic acid triacetate, esters of propionic acid with a sugar acid, an ester of propionic acid with gluconic acid, gluconic acid monopropionate, gluconic acid dipropionate, gluconic acid tripropionate, esters of butyric acid with a sugar acid, an ester of butyric acid with gluconic acid, gluconic acid monobutyrate, gluconic acid dibutyrate, gluconic acid tributyrate, esters of monochloroacetic acid with a sugar acid, an ester of monochloroacetic acid with gluconic acid, gluconic acid mono (monochloroacetate), gluconic acid di(monochloroacetate), gluconic acid tri(monochloroacetate), esters of dichloroacetic acid with a sugar acid, an ester of dichloroacetic acid with gluconic acid, gluconic acid mono(dichloroacetate), gluconic acid di(dichloroacetate), gluconic acid tri(dichloroacetate), esters of trichloroacetic acid with a sugar acid, an ester of trichloroacetic acid with gluconic acid, gluconic acid mono(trichloroacetate), gluconic acid di(trichloroacetate), gluconic acid tri(trichloroacetate); or combinations thereof.

3. The method of claim 1 wherein the ester comprises aliphatic esters, alkyl esters, methyl esters, ethyl esters, propyl esters, n-propyl esters, iso-propyl esters, butyl esters, n-butyl esters, iso-butyl esters, t-butyl esters, aromatic esters, benzyl esters, silyl esters, trimethylsilyl esters, triethylsilyl esters, dimethylisopropylsilyl esters, diethylisopropylsilyl esters, t-butyldimethylsilyl esters, t-butyldiphenylsilyl esters, triisopropylsilyl esters, or combinations thereof.

4. The method of claim 1 wherein the aqueous base fluid comprises a brine.

5. The method of claim 4 wherein the brine is present in the wellbore servicing fluid in an amount of from about 50 wt. % to about 95 wt. %, based on a total weight of the wellbore servicing fluid.

6. The method of claim 1 wherein the wellbore servicing fluid has a pH of less than 10.

7. The method of claim 1 wherein the wellbore servicing fluid comprises a rate adjustment material, an acid, a base, a surfactant, a mutual solvent, a corrosion inhibitor, or combinations thereof.

8. A method of servicing a wellbore in a subterranean formation comprising:
    preparing a wellbore servicing fluid comprising a breaking agent precursor and an aqueous base fluid;
    wherein the breaking agent precursor comprises an ester of at least one hydroxyl and/or one carboxylic acid functionalities of a sugar acid;
    contacting the wellbore servicing fluid with a filter cake in the wellbore and/or subterranean formation; and
    removing at least a portion of the filter cake from the wellbore and/or subterranean formation.

9. The method of claim 8 wherein the wellbore servicing fluid has a pH of less than 10.

10. The method of claim 8 wherein the wellbore servicing fluid comprises a rate adjustment material, an acid, a base, a surfactant, a mutual solvent, a corrosion inhibitor, or combinations thereof.

11. The method of claim 8 wherein the breaking agent precursor is present in the wellbore servicing fluid in an amount of from about 0.01 wt. % to about 50 wt. %, based on a total weight of the wellbore servicing fluid.

12. The method of claim 1, wherein the breaking agent precursor comprises an ester of an acid selected from the group consisting of lactic acid, formic acid, acetic acid, propionic acid, butyric acid, monochloroacetic acid, dichloroacetic acid, nitric acid, sulphuric acid, sulphonic acid, sulphinic acid, phosphoric acid, phosphorous acid, phosphonic acid, phosphinic acid, and sulphamic acid with a sugar acid.

* * * * *